(12) United States Patent
Liu

(10) Patent No.: US 7,707,026 B2
(45) Date of Patent: Apr. 27, 2010

(54) MULTILINGUAL TRANSLATION MEMORY, TRANSLATION METHOD, AND TRANSLATION PROGRAM

(75) Inventor: Shaoming Liu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 910 days.

(21) Appl. No.: 11/216,057

(22) Filed: Sep. 1, 2005

(65) Prior Publication Data

US 2006/0206304 A1     Sep. 14, 2006

(30) Foreign Application Priority Data

Mar. 14, 2005   (JP) .............................. 2005-071068

(51) Int. Cl.
    *G06F 17/28*   (2006.01)
(52) U.S. Cl. ...................... 704/7; 704/2; 704/3; 704/4; 704/5
(58) Field of Classification Search ................. 704/2–7
    See application file for complete search history.

(56) References Cited

U.S. PATENT DOCUMENTS

| | | | |
|---|---|---|---|
| 4,599,691 A * | 7/1986 | Sakaki et al. ................... | 704/2 |
| 5,721,899 A | 2/1998 | Namba | |
| 5,787,386 A * | 7/1998 | Kaplan et al. ................... | 704/8 |
| 5,895,446 A * | 4/1999 | Takeda et al. ................... | 704/2 |
| 6,393,389 B1 * | 5/2002 | Chanod et al. ................. | 704/7 |
| 6,507,678 B2 * | 1/2003 | Yahagi ........................ | 382/305 |
| 6,584,458 B1 * | 6/2003 | Millett et al. ................... | 707/3 |
| 6,675,169 B1 * | 1/2004 | Bennett et al. .............. | 707/101 |
| 7,447,623 B2 * | 11/2008 | Appleby ........................ | 704/2 |
| 2003/0023422 A1 | 1/2003 | Menezes et al. | |
| 2003/0023423 A1 * | 1/2003 | Yamada et al. ................. | 704/2 |
| 2006/0085180 A1 | 4/2006 | Menezes et al. | |

FOREIGN PATENT DOCUMENTS

| | | |
|---|---|---|
| EP | 1262879 A1 | 12/2002 |
| JP | 62-251875 A | 11/1987 |

(Continued)

OTHER PUBLICATIONS

Y. Kadoya, M. Fuketa, El-Sayed Atlam, K. Morita, T. Sumitomo, J. Aoe, "A compression algorithm using integrated record information for translation dictionaries", Information Sciences, vol. 165, Issues 3-4, Oct. 19, 2004, pp. 171-186.*

*Primary Examiner*—David R Hudspeth
*Assistant Examiner*—Paras Shah
(74) *Attorney, Agent, or Firm*—Sughrue Mion, PLLC

(57) ABSTRACT

A translation memory adapted to sentence-based translation includes a first retrieval dictionary of a first language having a first dictionary TRIE structure and a first index TRIE structure, and a second retrieval dictionary of a second language having a second dictionary TRIE structure and a second index TRIE structure. The first and second dictionary TRIE structures respectively store sub character strings on respective paths from roots to multiple nodes thereof. The first and second index TRIE structure respectively store index information to specify the sub character strings stored in the first and second dictionary TRIE structures. The index information stored in the first retrieval dictionary includes identification information that identifies the index information to specify the sub character strings in the second retrieval dictionary that are translations of those in the first retrieval dictionary.

16 Claims, 18 Drawing Sheets

FOREIGN PATENT DOCUMENTS

| | | |
|---|---|---|
| JP | 5-290082 A | 11/1993 |
| JP | 6-32508 A | 2/1994 |
| JP | 2003-030185 A | 1/2003 |
| JP | 2003-050797 A | 2/2003 |
| JP | 2006-134051 A | 5/2006 |

* cited by examiner

FIG. 11A

PHYSICAL STRUCTURE OF LANGUAGE TRIE

| 300 | 302 | 304 | 306 | 308 | 310 | 312 |
|---|---|---|---|---|---|---|
| DICTIONARY TRIE NODE ID | CHARACTER INFORMATION | CHARACTER STRING FLAG | TRANSLATION LANGUAGE ID | MEMORY POINTER OF LEFTMOST CHILD | MEMORY POINTER OF PARENT NODE | MEMORY POINTER OF RIGHT BROTHER NODE |

FIG. 11B

LOGICAL STRUCTURE OF LANGUAGE TRIE

| 320 | 321 | 322 | 324 | 326 | 328 | 330 | 332 |
|---|---|---|---|---|---|---|---|
| INDEX TRIE NODE ID | DICTIONARY TRIE NODE POINTER | SENTENCE FLAG | TRANSLATION LANGUAGE ID | MEMORY POINTER OF LEFTMOST CHILD | MEMORY POINTER OF PARENT NODE | MEMORY POINTER OF RIGHT BROTHER NODE | POINTER OF NODE IN TRANSLATION INDEX TRIE |

FIG. 12A

| FLAG | MEANING |
|---|---|
| 0 | END |
| 1 | NOT END |

FIG. 12B

| LANGUAGE ID | LANGUAGE |
|---|---|
| 1 | JAPANESE |
| 2 | CHINESE |
| 3 | ENGLISH |

FIG. 13A

LOGICAL STRUCTURE OF LANGUAGE TRIE

| CHARACTER INFORMATION | CHARACTER STRING FLAG + CHILD FLAG + TRANSLATION LANGUAGE ID | PARENT NODE ID | RIGHT BROTHER NODE ID |
|---|---|---|---|
| 340 | 342 | 344 | 346 |

FIG. 13B

LOGICAL STRUCTURE OF INDEX TRIE

| DICTIONARY TRIE NODE ID | SENTENCE FLAG + INDEX TRIE PARENT NODE ID | CHILD FLAG + RIGHT BROTHER NODE ID OF INDEX TRIE | NODE ID OF TRANSLATION INDEX TRIE |
|---|---|---|---|
| 350 | 352 | 354 | 356 |

HOW TO APPEND NODE ID

| 402 | 404 | 406 | 502 | 410 | 412 |
|---|---|---|---|---|---|
| NODE ID | CHARACTER INFORMATION | SENTENCE FLAG + CHILD FLAG + TRANSLATION LANGUAGE ID | NODE ID OF TRANSLATION CORRESPONDING TO LANGUAGE 1 OR LANGUAGE 2 | PARENT NODE ID | RIGHT BROTHER NODE ID |

MULTILINGUAL TRANSLATION MEMORY, TRANSLATION METHOD, AND TRANSLATION PROGRAM

BACKGROUND OF THE INVENTION

1. Field of the Invention

This invention relates to multilingual translation apparatuses that translate a sentence, character strings, or sentences in an original language into those in a target language, and more particularly, to a technique for a translation memory that utilizes a TRIE structure.

2. Description of the Related Art

The machine translation techniques that translate the original language into the target language include the straight word-for-word direct translation technique, the analysis based translation technique and interlingua method, the statistics-based translation technique, the example sentence based translation technique, and the like.

On the straight word-for-word direct translation technique, the respective words that compose a sentence in the original language is directly translated into words in the target language, and the translated text is made in the target language according to the statistical data or predetermined rules.

On the analysis based translation technique and interlingua method, morphological analysis, syntactic analysis, and semantic analysis are implemented on the sentence in the original language to convert into the semantics, the syntax, the morpheme in the target language, and the translation sentence is composed in the target language. On the interlingua method, the sentence in the original language is analyzed and converted into the interlanguage, and the translated sentence is made in the target language with the converted interlanguage.

On the statistics-based translation technique, the original language is translated into the target language with the language model and the translation model. On the example sentence based translation technique, the input sentence in the original language is translated into the sentence in the target language while referring to the knowledge base developed by learning translated example sentences, as the process that the human learns a foreign language.

From among the above-mentioned translation techniques, there are several patent documents that disclose the interlingua method. Japanese Patent Application Publication No. 6-32508 (hereinafter referred to as Document 1), for example, provides an automatic translation system that can translate from one original language into two or more target languages simultaneously with a single interlanguage. This translation system makes it possible to automatically translate the document written in the original language into multiple target languages at high levels of the document analysis that enables a sophisticated understanding of the message, definite expression of the knowledge, and "translation quality/time".

Japanese Patent Application Publication No. 62-251875 (hereinafter referred to as Document 2) describes an electronic translation apparatus that extracts the standardized interlanguage on the basis of the information related to the input original language, and generates the information related to the target language to correspond to the extracted standardized interlanguage on the basis of the extracted standardized interlanguage.

Japanese Patent Application Publication No. 5-290082 (hereinafter referred to as Document 3) provides a translation pattern for machine translation, with which the user can easily compose and efficiently retrieve. The sentence pattern is stored in a retrieval dictionary having a tree structure, and the input text sentence is checked with the retrieval dictionary. If successful, the corresponding sentence pattern in another language is obtained to make the text sentence in the target language with the corresponding sentence pattern. If not successful, translation is implemented with the language analysis and generation method of the machine translation technique.

Moreover, the techniques of the translation memory include the character index method and the word index method. With the character index method, the translation memory is realized by creating the character indexes for all the characters included in the bilingual corpus of translation pairs. With the word index method, the translation memory is realized by creating the character indexes for all the words included in the bilingual corpus of translation pairs.

It is to be noted that the conventional translation techniques have the following drawbacks. The straight word-for-word direct translation technique can be built in a relatively easy manner, yet at the same time, the translation accuracy cannot be assured. The interlingua method can work with the multilingual machine translation, yet the techniques of the syntactic analysis and semantic analysis are immature and the practical use is very difficult. Besides, a highly advanced language analysis and the generation technique of the interlanguage are indispensable for the interlingua method, and the interlingua method cannot be applied to the translation in many fields, it is difficult to enhance the function thereof, and it is also very difficult to maintain the translation tool.

The technique disclosed in Document 3 utilizes the tree structure to store the sentence patterns therein. If a part pattern is found at the time of checking the sentence pattern, the part pattern is replaced with one variable, enabling to enlarge an expression range of the pattern. However, if the word included in the sentence is not registered in the tree structure as the part pattern, there arises a problem in that the word cannot be associated even if there is a pattern corresponding to the sentence. In the tree structure shown in FIG. 7 of Document 3, the pattern of "improve" is associated in the sentence "improve the contact". However, if "function" of a part pattern in the "improve the function" is not registered, "improve" cannot be associated. Further, even if the part pattern of "function" is registered in a lower tree of the tree structure, the pattern of "improve" cannot be associated. This causes another problem in that a number of sentence patterns are necessary for covering a wide range of expressions.

The translation memory that utilizes the character index method has a difficulty in real-time translation. The translation memory that utilizes the word index method cannot be applied to the multilingual translation system, in addition to the difficulty in real-time translation.

SUMMARY OF THE INVENTION

The present invention has been made in view of the above circumstances to solve the above problems and provides a translation memory, a translation system, and a translation program that can accurately translate a sentence in an original language into that in a target language.

The present invention also provides a multilingual translation memory, a translation system, and a translation program that can translate a sentence in an original language into that in multiple target languages simultaneously.

The present invention further provides a translation memory, a translation system, and a translation program that can reduce a memory capacity of a bilingual dictionary or the like and that can translate at a high speed.

According to one aspect of the present invention, there may be provided a translation memory adapted to sentence-based translation including a first retrieval dictionary of a first language having a first dictionary TRIE structure and a first index TRIE structure; and a second retrieval dictionary of a second language having a second dictionary TRIE structure and a second index TRIE structure. The first and second dictionary TRIE structures respectively store sub character strings on respective paths from roots to multiple nodes thereof. The first and second index TRIE structure respectively store index information to specify the sub character strings stored in the first and second dictionary TRIE structures. The index information stored in the first retrieval dictionary includes identification information that identifies the index information to specify the sub character strings in the second retrieval dictionary that are translations of those in the first retrieval dictionary. The double structure of the dictionary TRIE structure and the index TRIE structure is employed so that the sub character strings can be retrieved, the memory capacity can be reduced as much as possible, and the sentence-based translation can be accelerated.

According to a further aspect of the present invention, there may be provided a machine translation system including the above-mentioned translation memory for sentence-based translation; a translation engine receiving a sentence that has not been translated with the translation memory and translating the sentence; and an output portion that separately outputs the sentence translated by the translation memory and a sentence translated with the translation engine.

According to another aspect of the present invention, there may be provided a translation memory adapted to sentence-based translation, including a retrieval dictionary having a dictionary TRIE structure and an index TRIE structure for each of first and second languages. The dictionary TRIE structure in each of the first and second languages stores sub character strings on respective paths from a root to multiple nodes thereof. The index TRIE structure in each of the first and second languages stores first index information to specify the sub character strings in a respective one of the first and second languages. The first index information includes identification information that identifies the second index information to specify the sub character strings in the second language. Multiple character strings of multiple languages are stored in one dictionary TRIE structure, and multiple pieces of index information of the multiple languages are stored in one index TRIE structure. This makes it possible to reduce the memory capacity and accelerate the translation process.

According to a further aspect of the present invention, there may be provided a storage medium readable by a computer to execute a translation program to translate an original language into a target language, the function of the storage medium includes storing sub character strings of first and second languages on respective paths from roots to multiple terminal nodes in first and second dictionary TRIE structures; and establishing index information that specifies the sub character strings stored in the first and second dictionary TRIE structures in first and second index TRIE structures in first and second retrieval dictionaries.

BRIEF DESCRIPTION OF THE DRAWINGS

Embodiments of the present invention will be described in detail based on the following figures, wherein:

FIG. 11A defines a physical structure of the node in the dictionary TRIE structure;

FIG. 11B shows the index TRIE structure;

FIGS. 12A and 12B show flags and languages IDs;

FIG. 13A shows a logical structure of the node in the dictionary TRIE structure;

FIG. 13B shows the logical structure of the node in the index TRIE structure;

DESCRIPTION OF THE EMBODIMENTS

A description will now be given, with reference to the accompanying drawings, of embodiments of the present invention.

Figure 1:
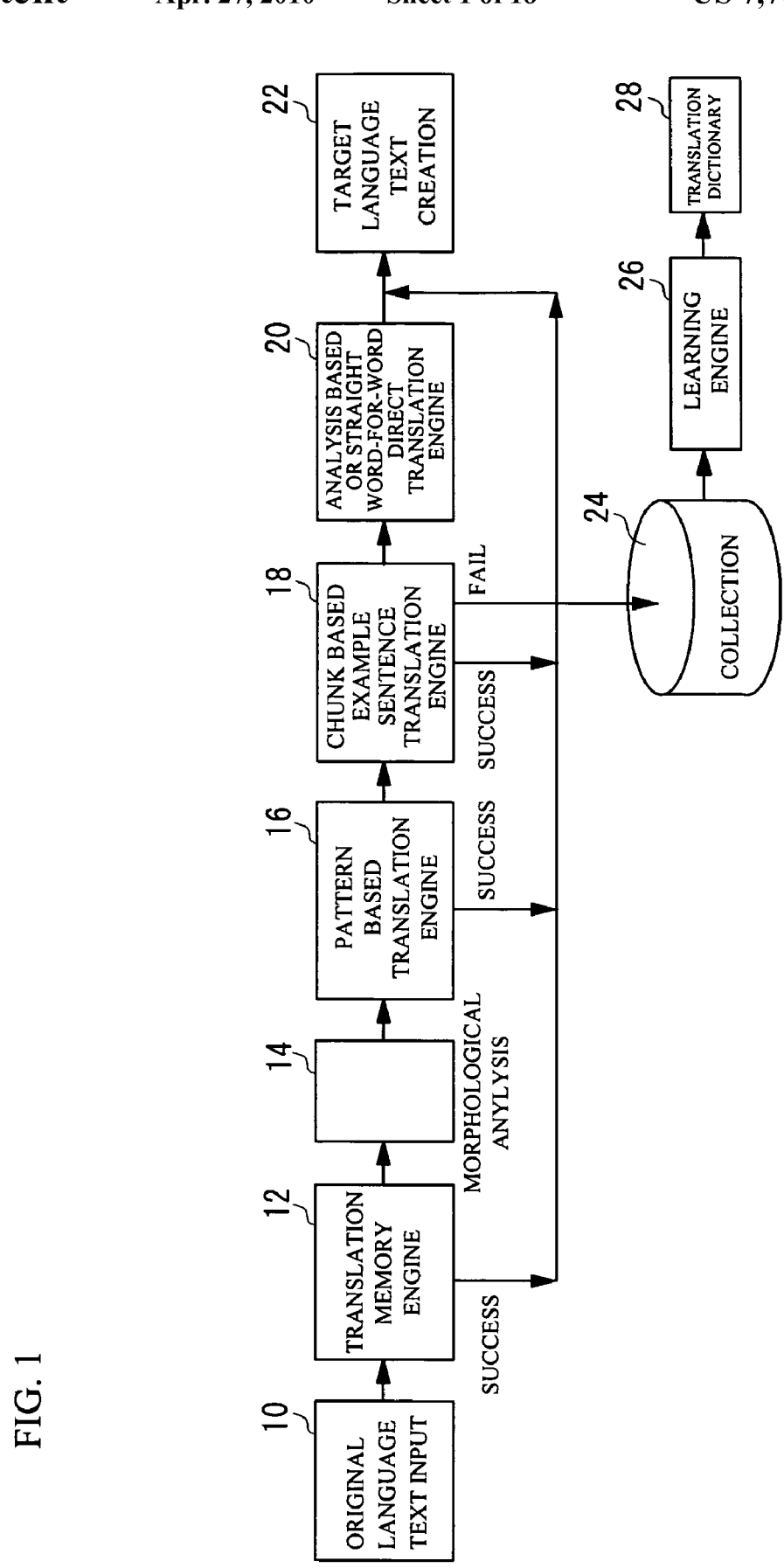
FIG. 1 shows a whole configuration of a machine translation system in accordance with a first embodiment of the present invention.

FIG. 1 shows a whole configuration of a machine translation system 1 in accordance with a first embodiment of the present invention. A machine translation system 1 is not capable of translating all the parts of the document properly. If the part that cannot be translated is forced to do, this will confuse the user, and this may adversely affect the understanding of the original content. So the machine translation system 1 is configured to give the translation result distinctions between success and failure or between high and low in the reliability. Also, the translation system is equipped with a learning function so that the part that cannot be translated may be collected automatically and an accurate translation may be given. In this manner, the accurate translation is given and the translation capabilities are improved.

The machine translation system 1 includes a translation memory engine 12, a morphological analysis portion 14, a pattern-based translation engine 16, a chunk-based example translation engine 18, an analysis-based or straight word-for-word direct translation engine 20, and a target language text form portion 22. The translation memory engine 12 translates each of the sentences input from an original language text sentence input portion 10. The part that cannot be associated in a database of the translation memory engine 12, that is, the part that cannot be translated accurately is input into the morphological analysis portion 14 to analyze the morpheme of the input part. The analysis result of the input sentence analyzed in the morphological analysis portion 14 is input into the pattern-based translation engine 16 to translate on a pattern basis. If the pattern-based translation engine 16 cannot translate the analysis result, the result of the morphological analysis of the input sentence is input into the chunk-based example translation engine 18 to translate with a chunk-based example sentence (a combination of words or a phrase such as noun phrase). If the chunk-based example translation engine 18 cannot translate the result of the morphological analysis, the result of the morphological analysis is input into the analysis-based or straight word-for-word direct translation engine 20 to translate the analysis result on a basis of analysis or a word. The target language text form portion 22 forms a text sentence in the target language.

A translation data of the part that has been translated successfully in the translation memory engine 12, the pattern-based translation engine 16, or the chunk-based example translation engine 18 is input into the target language text form portion 22. The target language text form portion 22 forms the text in the target language on the basis of the translation data. Here, a distinction is given to the part that has been translated successfully in order to indicate the accurate translation. On the other hand, the translation data of the part that has been translated by the analysis-based or straight word-for-word direct translation engine 20 is output in the target language text form portion 22 only as a reference. This enables the user to take a look at and know the translated text sentence which part is reliable or not.

The part that has failed in translation in the chunk-based example translation engine 18 is collected by the collection portion 24. A translator properly translates the collected part that has failed in translation. The result of the translation is output to a learning engine 26. The learning engine 26 writes the translation data into a translation dictionary 28 on the basis of the proper translation.

Figure 2:
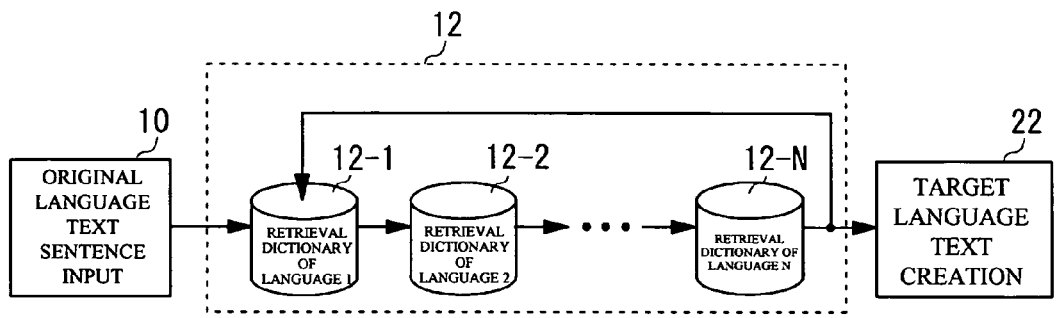
FIG. 2 shows a configuration of a translation memory engine.

FIG. 2 shows a configuration of the translation memory engine in accordance of the present embodiment. The translation memory engine 12 includes retrieval dictionaries 12-1, 12-2, ..., and 12-N to correspond to multiple numbers of N (1, 2, ..., N) languages. The retrieval dictionaries 12-1 to 12-N are connected to make a circulation so that the output from the retrieval dictionary 12-1 is input into the retrieval dictionary 12-2 and the output from the retrieval dictionary 12-N is input into the retrieval dictionary 12-1. The N retrieval dictionaries of the retrieval dictionaries 12-1 through 12-N may be connected to form a circulation bidirectionally. A text sentence is input from the original language text sentence input portion 10, and the translation memory engine 12 is capable of translating the text sentence into a language 1 with the retrieval dictionary 12-1, and is further capable of translating the translation result in the language 1 into a language 2 with the retrieval dictionary 12-2. In other words, the input text sentence can be translated into N languages simultaneously. The target language text form portion 22 outputs the translation in the target language designated by the user. The target language is not limited to a single language, and may include two or more.

Figure 3:
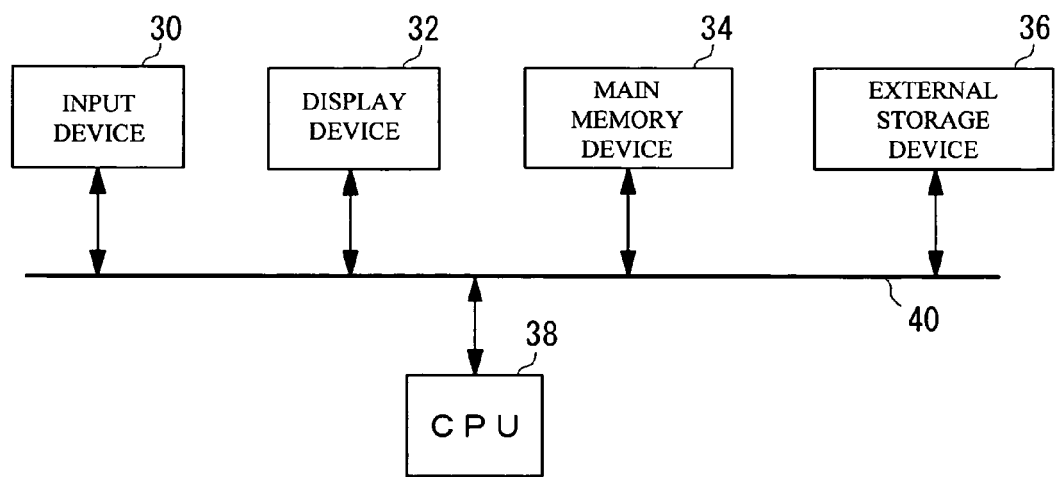
FIG. 3 shows a hardware configuration of the translation memory engine of an embodiment of the present invention.

FIG. 3 shows a hardware configuration of the translation memory engine 12. The translation memory engine 12 is composed of an input device 30, a display device 32, a main memory device 34, an external memory device 36, a central processing unit (CPU) 38, and a bus 40 that connects the aforementioned devices and the unit. The input device 30 may be a keyboard to input words by key operation, an optical reader that optically reads the words listed in the document, or a computation result of another piece of hardware or software.

The display device 32 includes a display or the like that outputs the text sentence in the original language or the sentence in the target language translated from the original language. The main memory device 34 includes a ROM or RAM to store the data such as the program to control the translation memory and the computation results. The external memory device 36 includes, for example, a large capacity storage device such as a hard disc to store the translation dictionaries such as the retrieval dictionaries 12-1 through 12-N necessary for translation of the sentences. The CPU (Central Processing Unit) 38 controls each device or unit according to the program stored in the main memory device 34.

Figure 4:
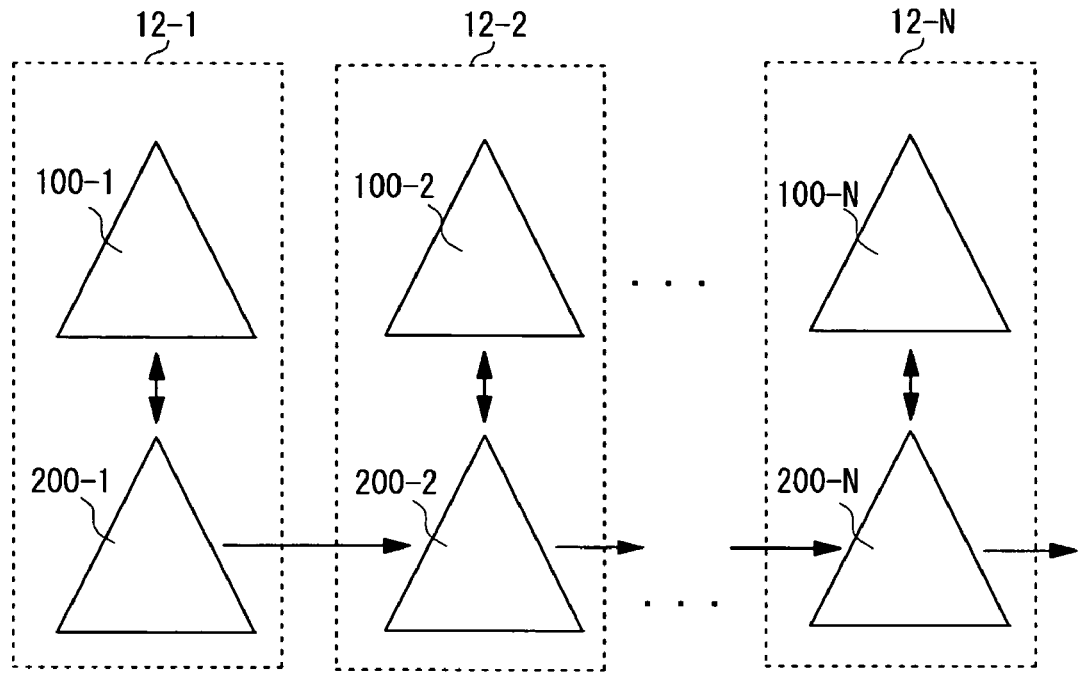
FIG. 4 shows a configuration of a retrieval dictionary of the translation memory.

Next, a description will be given of the translation memory engine in more detail. FIG. 4 shows a configuration of the retrieval dictionary of the translation memory. Each of the retrieval dictionaries 12-1 through 12-N includes dictionary TRIE structures 100-1 through 100-N and index TRIE structures 200-1 through 200-N. The dictionary TRIE structure 100-1 stores sub character strings related to the language 1 in a TRIE structure. The index TRIE structure 200-1 stores the index information in the TRIE structure to specify the sub character strings in the dictionary TRIE structure 100-1. A double TRIE structure having the dictionary TRIE structure and the index TRIE structure is established in each of the languages.

Figure 5:
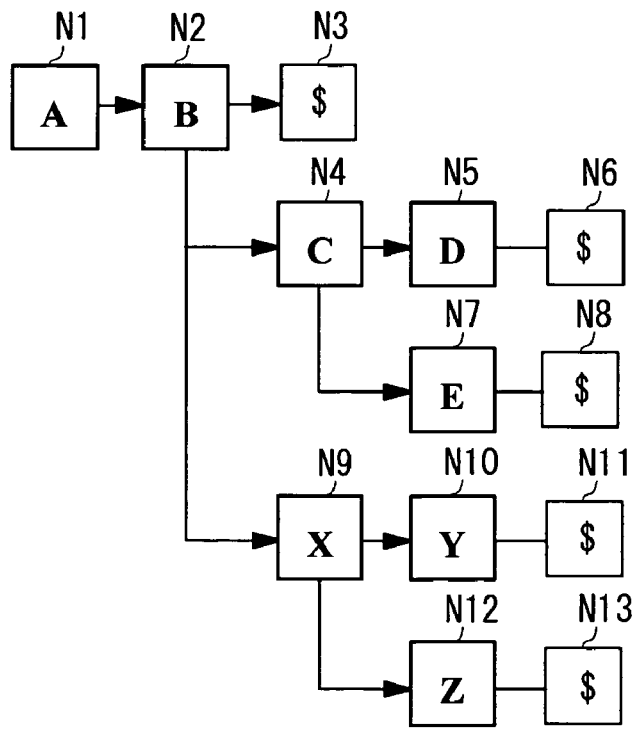
FIG. 5 shows an example of a TRIE structure.

The TRIE structure is a tree structure in which commonly used character strings in a group of retrieval keys are merged in the linguistic information processing field. FIG. 5 shows an example of the TRIE structure in which five retrieval keys "AB", "ABCD", "ABCE", "ABXY", and "ABXZ" are included. $ in FIG. 5 may be used as a special character for denoting a postfix of a word. In the retrieval from the TRIE structure, while the string characters to be searched are sequentially scanned from the left, the tree is traced from the root (a node N1) to respective nodes N2 through N13 having characters and the word matched with the character string to be searched is extracted. With the TRIE structure, the character can be retrieved rapidly within a period proportional to the character string to be searched without depending the number of the search keys.

Figure 6:
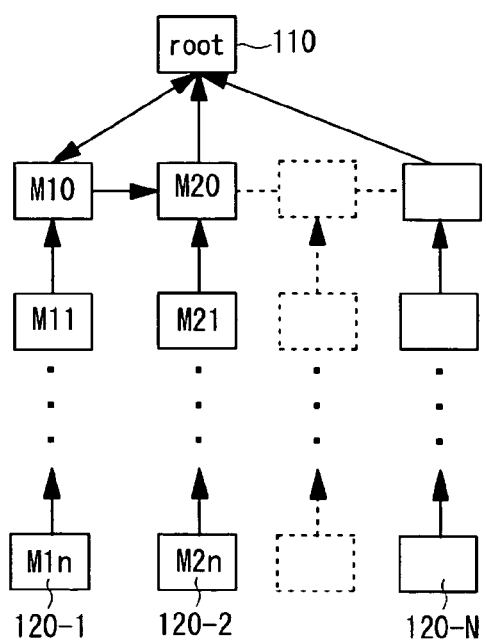
FIG. 6 is a view illustrating a dictionary TRIE structure.

FIG. 6 is a view illustrating the dictionary TRIE structure. The dictionary TRIE structure stores multiple sub character strings on a path from a root 110 to terminal nodes 120-1 through 120-N. For example, tracing the path from the terminal node 120-1 to the root specifies sub character string M10, M11, ..., and M1n included in the nodes on the path. In the same manner, tracing the path from the terminal node 120-2 to the root specifies the sub character string of M20, M21, ..., and M2n included in the nodes on the path. The number of the nodes existent on the path from the root to the terminal node, namely, the number of the characters of the sub character strings may be decided as necessary.

Figure 7:
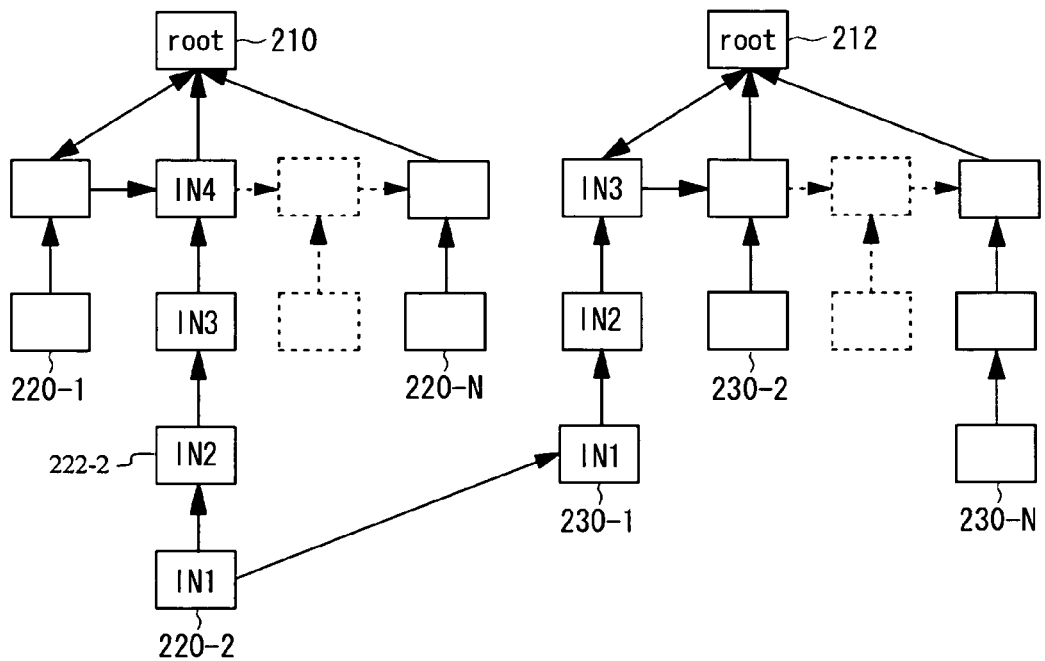
FIG. 7 is a view illustrating an index TRIE structure.

FIG. 7 is a view illustrating the index TRIE structure. The index TRIE structure makes it possible to search and specify the character string included in the dictionary TRIE structure. The respective nodes in the index TRIE structure store the index information to specify the strings. The index information includes the information that identifies the terminal node of the dictionary TRIE structure. For example, anode 222-2 stores an index information IN2, and the index information IN2 includes the information that specifies the terminal node 120-2 of the dictionary TRIE structure. A node 220-2 stores an index information IN1, and the index information IN1 includes the information that specifies the terminal node 120-1 of the dictionary TRIE structure. In other words, the index information IN2 can specify the sub character string of M20, M21, . . . , and M2n, and the index information IN1 can specify the sub character string of M10, M11, . . . , and M1n. In this manner, the sentence composed of the sub character strings in the dictionary TRIE structure can be specified by the index information included in the path from the terminal node to the root in the index TRIE structure.

In addition, the terminal nodes 220-1, 220-2, , and 220-N in the index TRIE structure are linked to terminal nodes 230-1, 230-2, . . . , and 230-N in another index TRIE structure. This linkage specifies the relation between the sentence in the original language and the translated sentence in the target language. For instance, the terminal node 220-2 includes the information of the terminal node 230-1 provided in the index TRIE structure of another language in order to link the terminal node 230-1. The sentence composed of the sub character strings specified by the index information IN1, IN2, and IN3 included in the nodes existent on the path from the terminal node 230-1 to a root 212 is a translation of the sub character strings specified by the index information IN1, IN2, IN3, and IN4 included in the nodes existent on the path from the terminal node 220-2 to a root 210.

Figure 8:
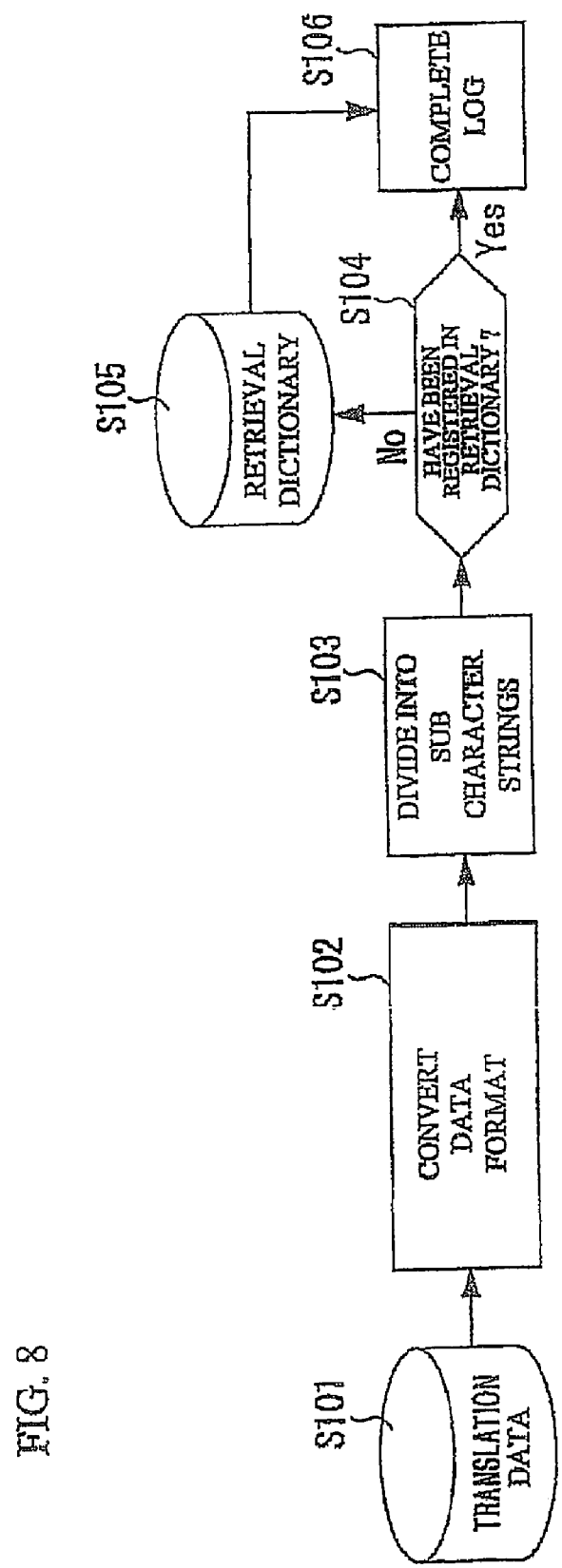
FIG. 8 is a flowchart of building the dictionary TRIE structure.

A description will next be given of a creation flow of the dictionary TRIE structure. Referring to FIG. 8, the dictionary TRIE structure is newly registered or added. Data is input from a bilingual data file for a translation memory (step S101). The CPU 38 converts the input data into Unicode in the data format conversion (step S102). This creates a character string J and another character string C. The character string C is a translation of the character string J.

Figure 9:
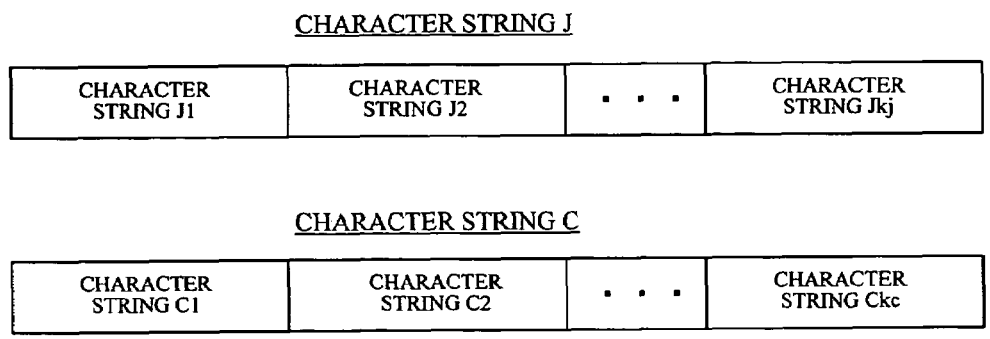
FIG. 9 is a view showing an example of driving a character string.

The CPU 38 then divides the character string J into a kj number of sub character strings J1, J2, . . . , and Jkj to have a length mj, from left to right, as shown in FIG. 9 (step S103). In the same manner, the CPU 38 divides the character string C into a kc number of sub character strings C1, C2, . . . , and Ckc to have a length mc, from left to right.

Next, the CPU 38 checks whether the sub character strings J1, J2, , and Jkj or the sub character strings C1, C2, . . . , and Ckc are included in the retrieval dictionary of the respectively corresponding languages (step S104). If not included, the CPU 38 registers the sub character strings J1, J2, . . . , and Jkj or the sub character strings C1, C2, . . . , and Ckc in the corresponding retrieval dictionary respectively, stores the information in a log file and completes the procedure (step S106).

In contrast, if the sub character strings J1, J2, . . . , and Jkj or the sub character strings C1, C2, . . . , and Ckc are included in the retrieval dictionary of the respectively corresponding languages, the CPU 38 stores the information in the log file and completes the procedure (step S106).

The user is able to edit the content of the retrieval dictionary stored in the external memory device 36. The display device 32 is made to display the character string registered in the existent retrieval dictionary so as to correct with the input device 30.

Figure 10:
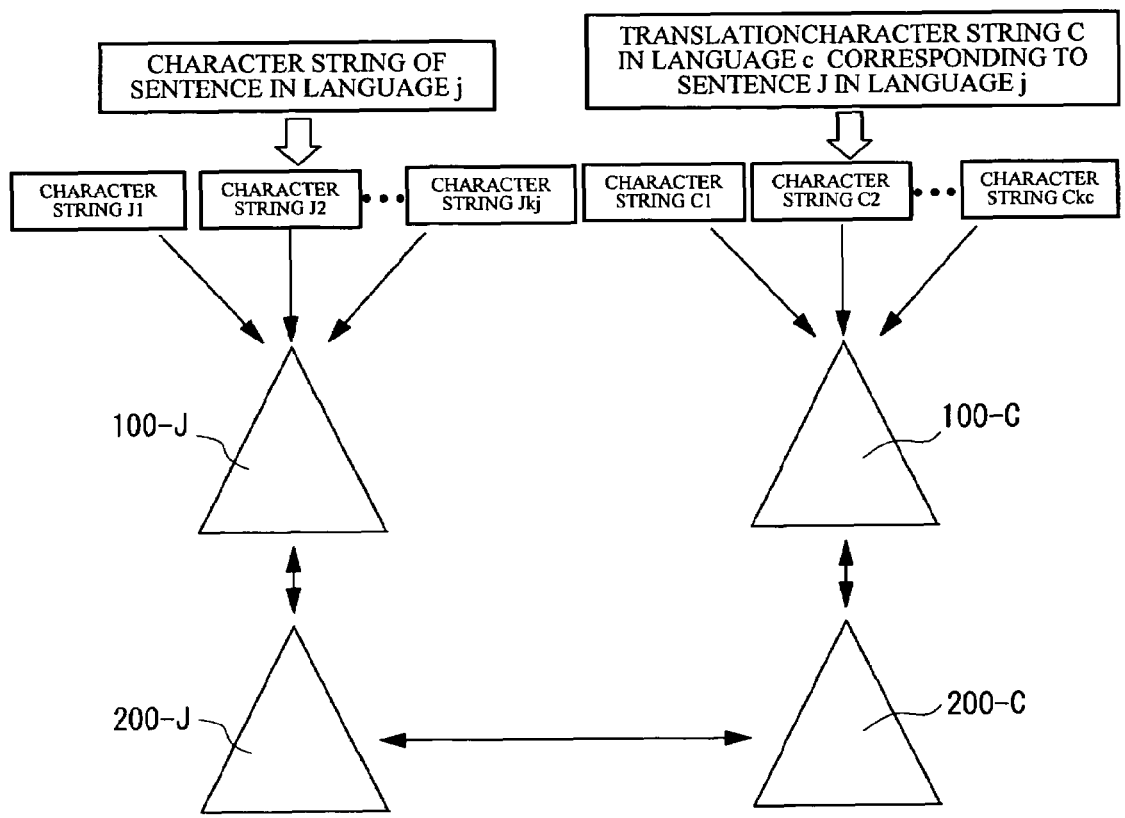
FIG. 10 shows an example of registering the translation data in the retrieval dictionary.

FIG. 10 shows an example of registering the translation data in the retrieval dictionary. In FIG. 10, a dictionary TRIE structure 100-J is of a language J, and a dictionary 100-C is of a language C. As described above, As described above, the character string in the language J, which is one of the two languages, is input from the translation data, and the character string in the language J is divided into the sub character strings J1, J2, . . . , and Jkj and inserted into the dictionary TRIE structure 100-J. On the other hand, the character string C, which is a translation of the character string J, is divided into the sub character strings C1, C2, . . . , and Ckc and inserted into the dictionary TRIE structure 100-C.

The dictionary TRIE structure 100-J stores the path from the root to the terminal node to specify the sub character strings J1, J2, . . . , and Jkj. The index TRIE structure 200-J of the language J is thus formed. In the same manner, the dictionary TRIE structure 100-C stores the path from the root to the terminal node to specify the sub character string C1, C2, . . . , and Ckc. The index TRIE structure 200-C of the language C is thus formed.

Next, the relation is linked between the terminal node in the index TRIE structure of the language J and the terminal node in the index TRIE structure of the language C. In this manner, the retrieval dictionary is built to correspond to the multiple languages on the basis of the translation data.

In addition, with respect to the method of dividing into the sub character strings, for example, the number of the characters included in a sub character string may be predetermined. In this case, the input sentence divided by a predetermined number is set to the number of the sub character strings. Alternately, the number of the sub character strings may be predetermined. In this case, the input sentence (character string) divided by the number of the sub character strings is set to the number of the characters in a sub character string. The number of the characters in the subcharacter string may be equal between the language J and the language C, or may be different.

Next, a description will be given of a structural definition of the node in the TRIE structure. There are two structural definitions of the node including a physical structure and a logical structure. FIG. 11A defines the physical structure of the node in the dictionary TRIE structure. A dictionary TRIE node ID 300 denotes information (ID) to identify the present node. A character information 302 denotes whether the character included in the present node is a Japanese kanji character, Japanese hiragana character, Japanese katakana character, or alphabet. A character string flag 304 is a flag indicating whether or not the present node is a last character in the character string as shown in FIG. 12A. If the flag is 0, this means the end of the character string. If the flag is 1, this does not mean the end of the character string. For example, the terminal node in the dictionary TRIE structure has the flag of 0, and other nodes have the flags of 1.

A translation language ID 306 identifies the language, as shown in FIG. 12B. For instance, Japanese is set to 1, Chinese is set to 2, and English is set to 3. Moreover, also stored are a memory pointer of a leftmost child node 308, a memory pointer of a parent node 310, and a memory pointer of a right brother node 312, which are necessary information in the TRIE structure.

FIG. 11B shows the index TRIE structure. An index TRIE node ID 320 includes the information to identify the present node. A dictionary TRIE node pointer 321 includes the information to identify the node in the dictionary TRIE structure corresponding to the present node. That is to say, this information specifies whether or not the present node is the terminal node in the dictionary TRIE structure. A sentence flag 322 includes the information to specify whether or not the present node is the terminal node. Then, also included are a translation language ID 324, a memory pointer of a left most child node 326, a memory pointer of a parent node 328, and a memory pointer of a right brother node 330. A pointer of a translation index TRIE node ID 332 includes the information that specifies the terminal node in the index TRIE structure of the translation language.

FIG. 13A shows the logical structure of the node in the dictionary TRIE structure. A reference numeral 340 denotes the type of the character included in the node, as described. A reference numeral 342 denotes the character string flag+a child flag+the translation language ID. As described above, if the character string flag is "1", the present node is an intermediate node, and if the character string flag is "0", the present node includes a character string, namely, the information on the path from the root to the present node represents a character string. If the child flag is "0", this means there is no node lower than the present one. If the child flag is "1", this means there is a node lower than the present one. The translation language ID is same as described above, and a parent node ID 344 and a right brother node 345 are also included.

FIG. 13B shows the logical structure of the node in the index TRIE structure. A dictionary TRIE node ID 350 is a terminal node ID in the dictionary TRIE node structure of the present node. The sentence flag is the information indicating whether or not the present node is the end of the sentence. The terminal node of the index TRIE structure denotes the end of the sentence, and for example, the flag of the terminal node is "1" and the flags of the other nodes are "0". An index TRIE parent node ID 352 is the information to specify the parent node of the present node. Additionally, the child flag +an index TRIE right brother node ID 354 and a translation index TRIE node ID 356 are stored.

Figure 14:
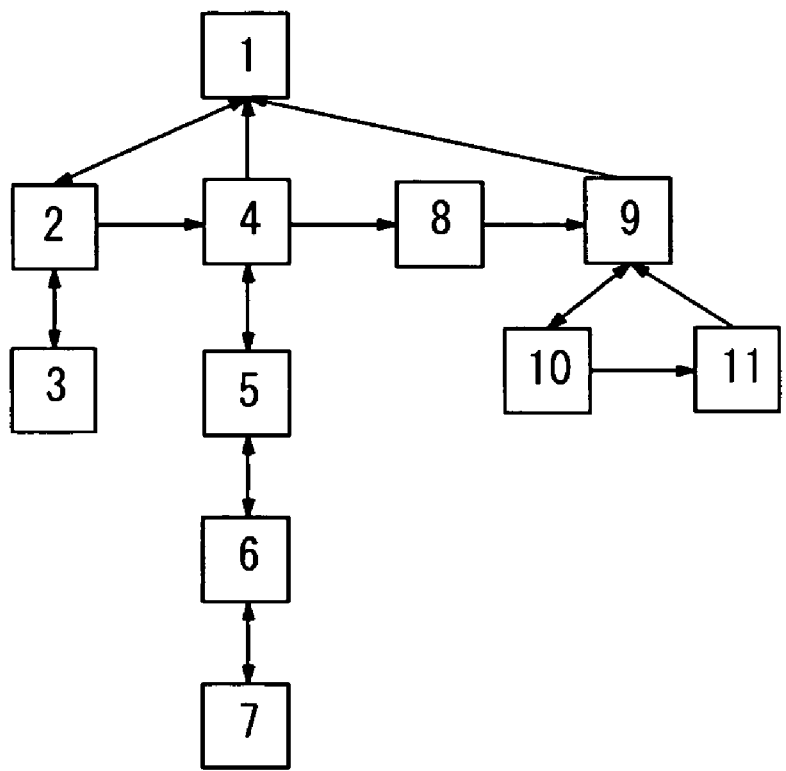
FIG. 14 is a view showing how to append node ID.
Figure 15:
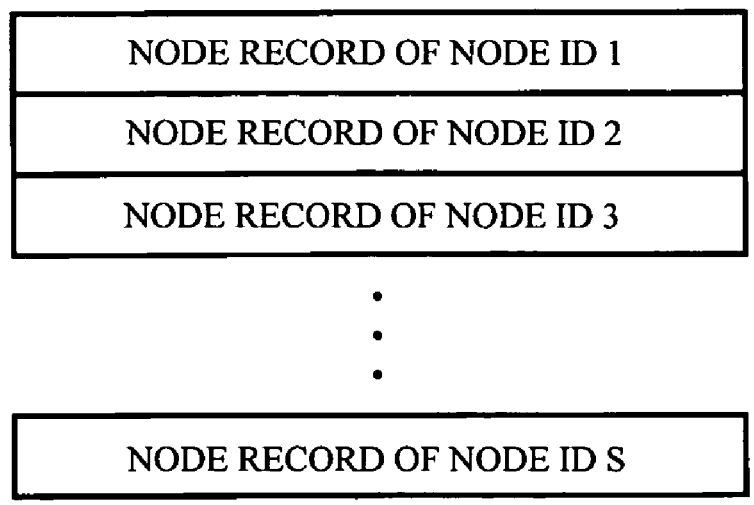
FIG. 15 shows an arrangement of a node record.

A description will be given of how to append the node ID. FIG. 14 is a view showing how to append the node ID. The TRIE structure is retrieved in the depth first order, the number is incremented from 1 or 0, according to the retrieval sequence, and then the node ID is appended. After the node ID is appended, recodes corresponding to the node IDs are arranged and stored according to the node ID sequence. The records are arranged according to the node ID sequence, allowing a prompt access to the node information specified by the node ID.

Figure 16:
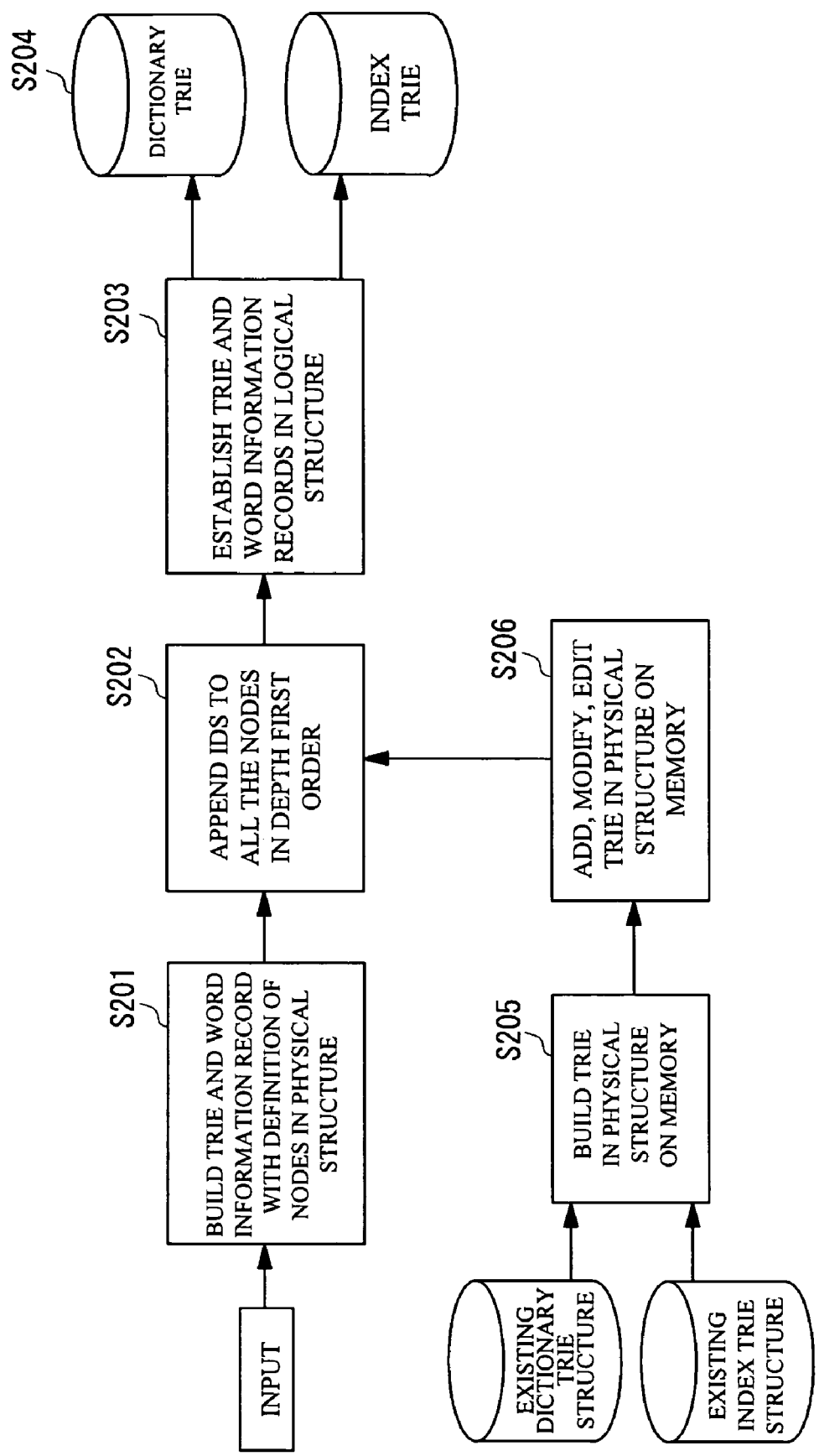
FIG. 16 shows a process flow of the retrieval dictionary.

Now, FIG. 16 shows a process flow of the retrieval dictionary. In registering a sentence newly, the sentence input from the input device 30 shown in FIG. 3 is divided into the sub character strings. The sub character strings compose a word information record in a dictionary TRIE structure according to the node definition of the physical structure shown in FIG. 11A (step S201).

Next, the IDs are appended to all the nodes in the physical TRIE structure in the depth first order (step S202). Then, the logical TRIE structure and the word information record are built with the use of the physical TRIE structure and the node IDs (step S203). The dictionary TRIE structure and the index TRIE structure are thus established (step S204).

The existent dictionary TRIE structure and the existent index TRIE structure are converted into the physical structure on the memory for adding and editing the sentence (step S205). The sentence or the sub character string is edited or added in the physical TRIE structure on the memory (step S206). Here, the root in the TRIE structure has to be set Null, and the children of the root have to be arranged from left to right in ascending order of the word information value. For example, with respect to the language requiring two bytes for representing one character, each node in the dictionary TRIE structure represents one character with two bytes.

A description will now be given of a setting of a multilingual retrieval dictionary.

(1) A group of text sentences in the language 1, the language 2, . . . , and the language N are respectively divided into multiple sub character strings for the language 1, the language 2, . . . , and the language N. The divided sub character strings are used for building a translation dictionary TRIE structure and an index TRIE structure in each of the languages.

(2) The node IDs are appended to the N number of the translation dictionary TRIE structures and the index TRIE structures.

(3) Storage of the TRIE structure: the node information of the TRIE structure has a constant record length, and so one node information is regarded as one record. The node information of the TRIE structure is arranged in the order of the node ID. This enables to take out the node information designated by the node ID.

(4) Each of the text sentences in an language i (i=1, 2, . . . , and N) is checked with the translation dictionary TRIE structure of the language i, with the use of a set of multilingual translation sentences having the text sentence in the language 1, the text sentence in the language 2, . . . , and the text sentence in the language N, and is also checked with the index TRIE structure of the language i, with the use of the k number of the node IDs (ID1 (i), ID2 (i), . . . , and IDk(i)) obtained by the aforementioned checking.

(5) If the checking is matched, the node ID of the index TRIE structure is obtained. Thus taken node ID is set to I (i). A translation index TRIE node ID (the translation language designates i+1) is represented as T(i), and accordingly, T(1)=I(2), T(2)=I(3), . . . , and T(N)=I(1).

Figure 17:
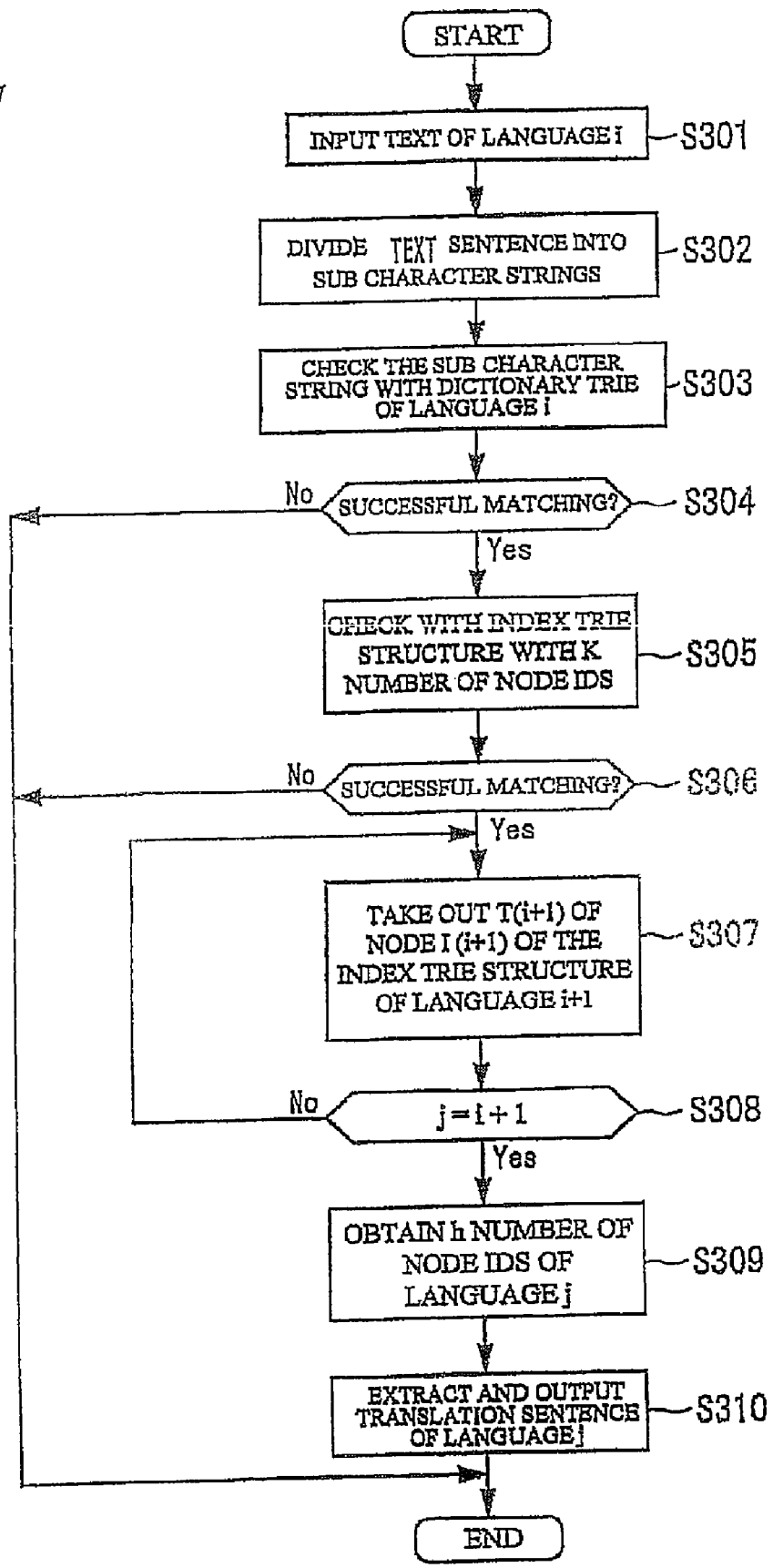
FIG. 17 is a flowchart illustrating operation of translating a text sentence of a language i into another text sentence of a language j.

A description will be given, with reference to FIG. 17, of a translation flow of translating the text sentence in the language i into the text sentence in the language j. The text sentence is input (step S301). The text sentence is divided into the sub character strings (step S302). Thus divided sub character strings are respectively checked with the translation dictionary TRIE structure of the language i (step S303).

If the matching is successful (step S304), the index TRIE structure of the language i is checked with, with the use of the k number of the node IDs (ID1 (i), ID2 (i), . . . , and IDk(i)) obtained by the aforementioned checking. If the matching is successful (step S306), the value of the T(i+1) of the node I(i+1) in the index TRIE structure of the language i+1 is obtained, according to the value of T(i) of the translation index TRIE node ID that corresponds to the node I (i) of the index TRIE structure of the language i (step S307).

If j is equal to i+1 (step S308), the information on the path from the node I (i+1) to the root is obtained, and the h number of the node IDs in the translation dictionary TRIE structure of the language j (step S309). The translations of the node IDs are obtained from the translation dictionary TRIE structure of the language j, with the ID1 (j), ID2 (j), . . . , and IDh(j), and thus obtained translations are output (step S310) If j is not equal to i+1, go back to step S307. In this manner, the text sentence of the language i is translated into the text sentence of the language j.

Figure 18:
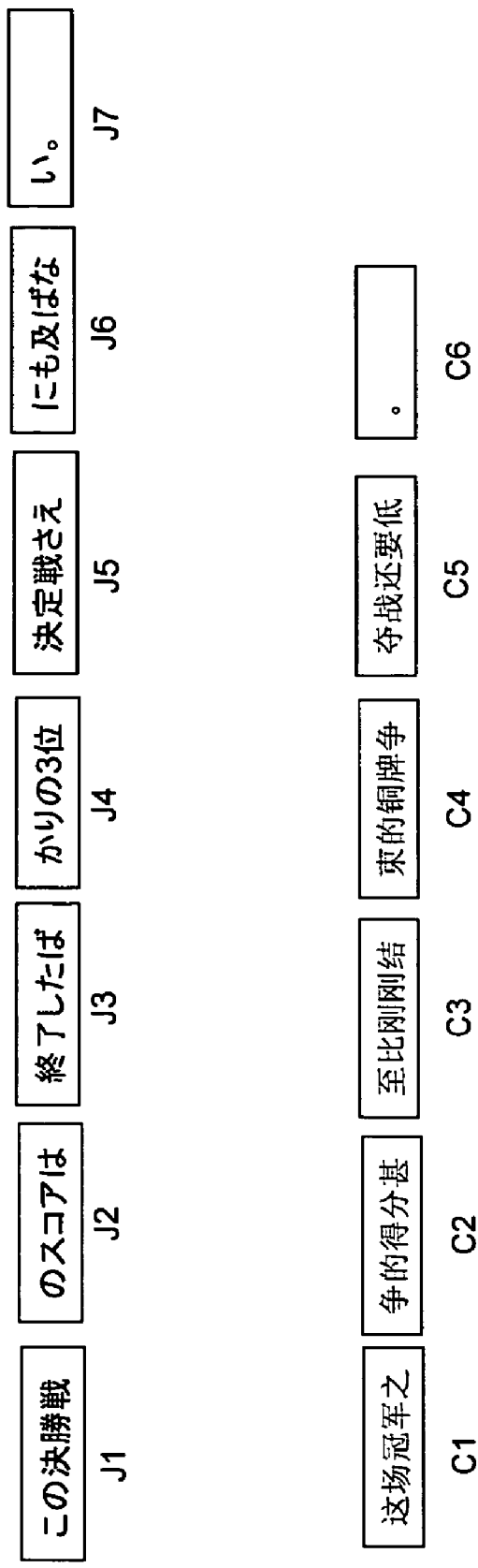
FIG. 18 shows a translation example between Japanese and Chinese.

A description will now be given of an example of the machine translation between Japanese and Chinese. This example is applicable to the machine translation between the languages in which one character is represented with two bytes. First, a description will be given of an operation for establishing the translation dictionary. Groups of the text sentences in Japanese and in Chinese are respectively used and divided into multiple sub character strings of Japanese and Chinese respectively. Thus divided sub character strings are used to build the translation dictionary TRIE structures and the index TRIE structures of the respective languages. An example of the text sentence "The score in this final match does not reach that in the third-place match that has just finished", as shown in FIG. 18, will be described how to translate from Japanese into Chinese. The text sentence in Japanese is, as shown in FIG. 18, divided into sub character strings J1 through J7. The text sentence in Chinese is, as shown in FIG. 18, divided into C1 through C6, both of which are stored in the respective dictionary TRIE structures. Here, the number of characters in the sub character strings is set to five.

Figure 19:
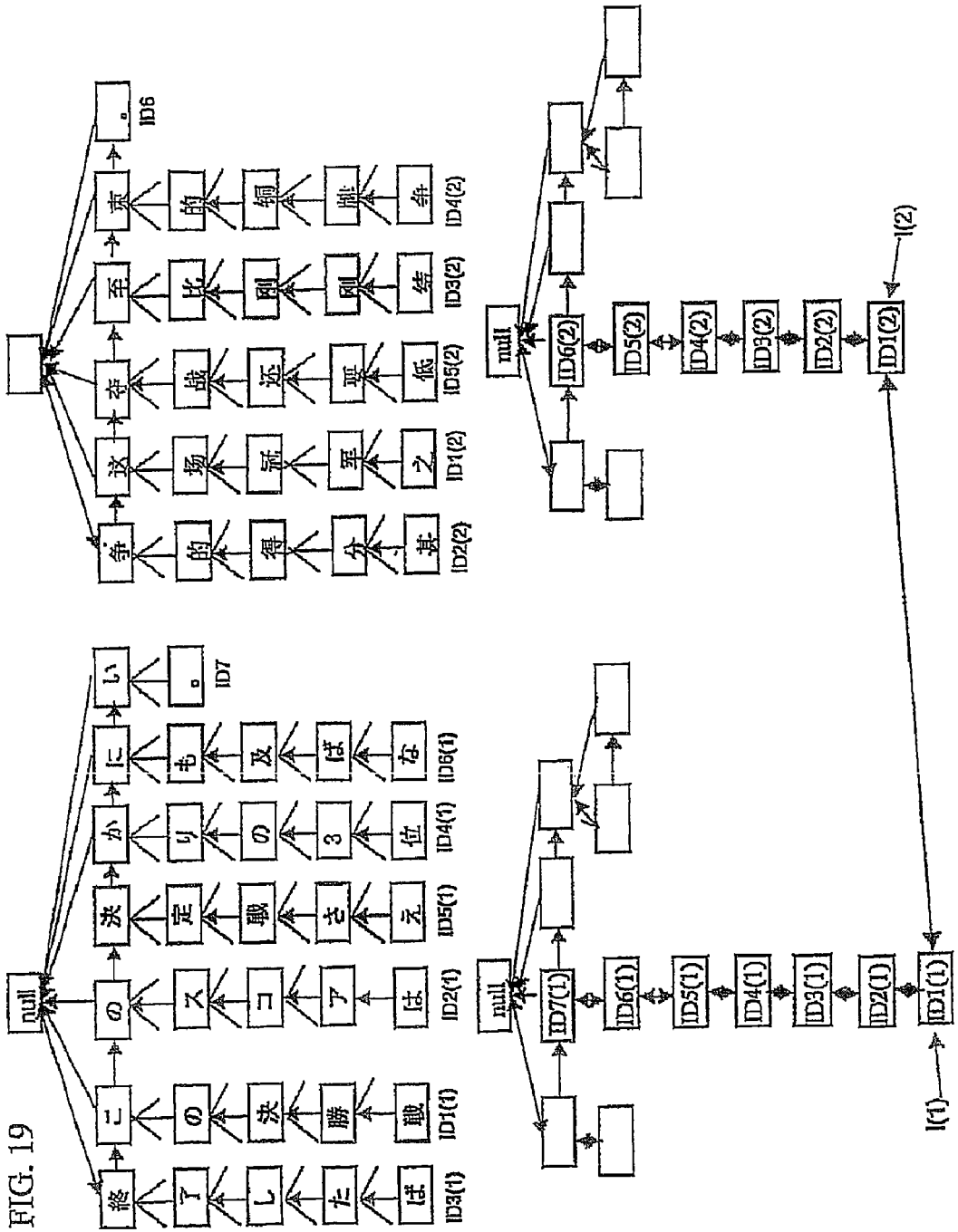
FIG. 19 is a view illustrating the dictionary TRIE structures and the index TRIE structures of Japanese and Chinese.

FIG. 19 is a view illustrating the dictionary TRIE structures and the index TRIE structures of Japanese and Chinese. The node IDs are appended to the dictionary TRIE structures and the index TRIE structures of Japanese and Chinese.

The Japanese text sentence is checked with the dictionary TRIE structure of Japanese with the use of sets of Japanese text sentences and Chinese text sentences. Thus obtained seven node IDs (ID1(1), ID2(1), . . . , and ID7(1)) in the dictionary TRIE structure of Japanese is then checked with the index TRIE structure of Japanese. A node ID1(1) is take out when the checking is matched in the index TRIE structure of Japanese.

The Chinese text sentence is checked with the dictionary TRIE structure of Chinese. Thus acquired six node IDs (ID1(2), ID2(2), , and ID6(2)) are checked with the index TRIE structure of Chinese. A node ID1(2) is obtained when the checking is matched in the index TRIE structure of Chinese. Assuming that a node ID of a node I(1) in the index TRIE structure of Chinese is represented as T(1), T(1) is equal to I(2). Assuming that the node ID of a node I(2) in the index TRIE structure of Japanese is represented as T(2), T(2) is equal to I(1).

Next, a translation operation will be described. The Japanese text sentences are divided into the sub character strings J. The divided sub character strings J1, J2, . . . , and J7 are checked with the translation dictionary TRIE structure of Japanese, and ID1(1), ID2(1), . . . , and ID7(1) are obtained.

Then, ID1 (1), ID2 (1), , and ID7 (1) are checked with the index TRIE structure of Japanese as the sub character sentences. The node I(1) is obtained by this checking. The node I(2) in the index TRIE structure of Chinese is obtained by the value of the node ID(1) in the translation index TRIE structure.

The index TRIE structure of Chinese is traced back from the node I(2) to the root in the index TRIE structure of Chinese, and the node IDs (ID1(2), ID2(2), . . . , and ID6(2)) in the translation dictionary TRIE structure of Chinese are obtained. The Chinese translation is extracted from the translation dictionary TRIE structure of Chinese with the node IDs (ID1(2), ID2(2), . . . , and ID6(2)).

Figure 20:
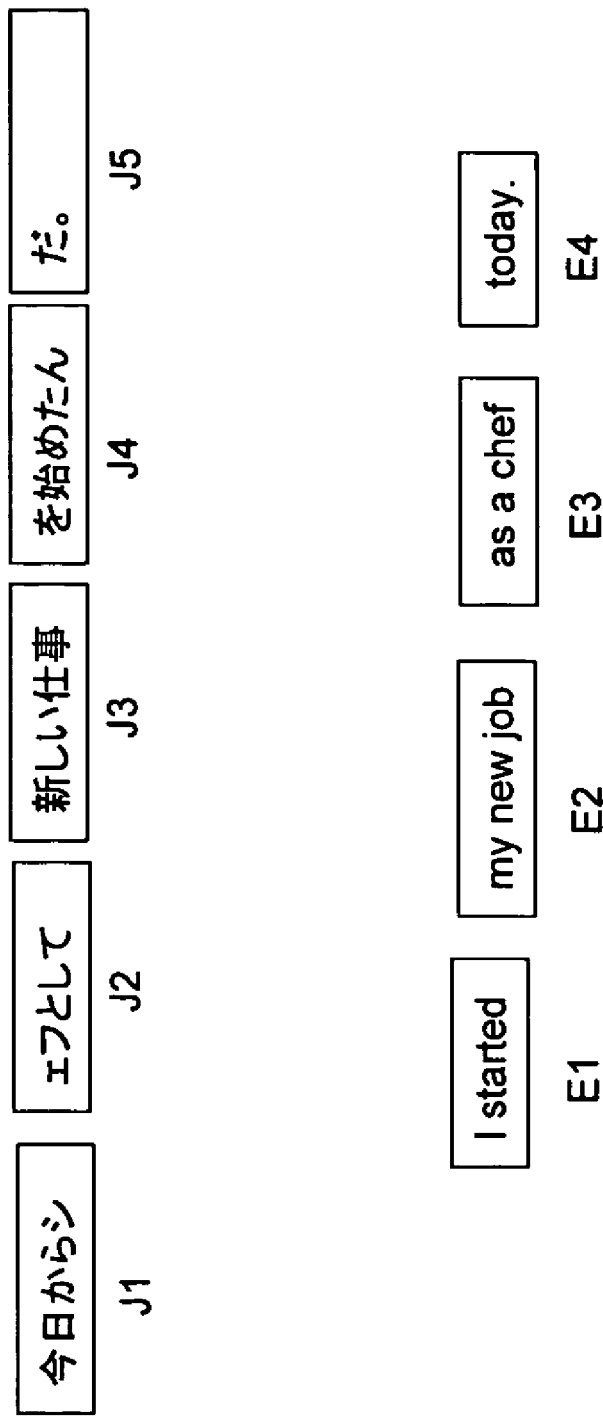
FIG. 20 shows a translation example between Japanese and English.

A description will now be given of an example of the machine translation between Japanese and English. This example is applicable to the machine translation between a language in which one character is represented with two bytes and another language in which one character is represented with one byte. First, a description will be given of an operation for establishing the translation dictionary. Groups of the text sentences in Japanese and in English are respectively used and divided into multiple sub character strings of Japanese and English respectively. Thus divided sub character strings are used to build the translation dictionary TRIE structures and the index TRIE structures of the respective languages. An example of the text sentence "I started my new job as a chef today.", as shown in FIG. 20, will be described how to translate from Japanese into English. The text sentence in Japanese is, as shown in FIG. 20, divided into sub character strings J1 through J5. The text sentence in English is, as shown in FIG. 20, divided into E1 through E4, both of which are stored in the respective dictionary TRIE structures. Here, the number of characters in the sub character strings of Japanese is set to five, and the number of the sub character strings of English is set to ten.

Figure 21:
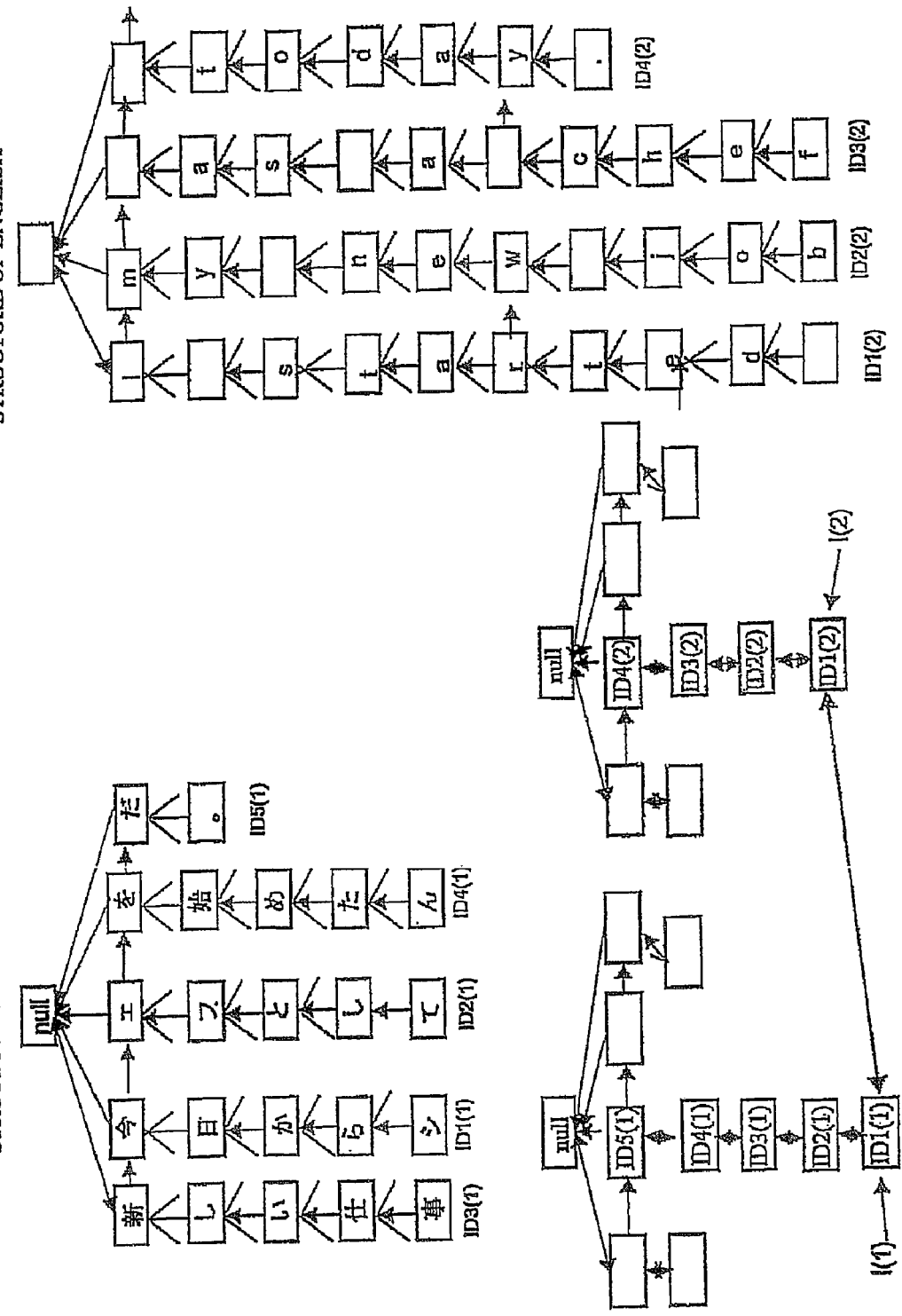
FIG. 21 is a view illustrating the dictionary TRIE structures and the index TRIE structures of Japanese and English.

FIG. 21 is a view illustrating the dictionary TRIE structures and the index TRIE structures of Japanese and English. The node IDs are appended to the dictionary TRIE structures and the index TRIE structures of Japanese and English.

The Japanese text sentence is checked with the dictionary TRIE structure of Japanese with the use of sets of Japanese text sentences and English text sentences. Thus obtained five node IDs (ID1(1), ID2(1), . . . , and ID5(1)) in the dictionary TRIE structure of Japanese is then checked with the index TRIE structure of Japanese. A node ID1(1) is obtained when the checking is matched in the index TRIE structure of Japanese.

The English text sentence is checked with the dictionary TRIE structure of English. Thus acquired four node IDs (ID1(2), ID2(2), . . . , and ID4(2)) are checked with the index TRIE structure of English. A node ID1(2) is obtained when the checking is matched in the index TRIE structure of English. Assuming that a node ID of a node I(1) in the index TRIE structure of English is represented as T(1), T(1) is equal to I(2). Assuming that the node ID of a node I(2) in the index TRIE structure of Japanese is represented as T(2), T(2) is equal to I(1).

Next, a translation operation will be described. The Japanese text sentences are divided into the sub character strings J. The divided sub character strings J1, J2, . . . , and J5 are checked with the translation dictionary TRIE structure of Japanese, and ID1(1), ID2(1), . . . , and ID5(1) are obtained.

Then, ID1(1), ID2(1), . . . , and ID5(1) are checked with the index TRIE structure of Japanese as the sub character sentences. The node I(1) is obtained by this checking. The node I(2) in the index TRIE structure of English is obtained by the value of the node ID(1) in the translation index TRIE structure.

The index TRIE structure of English is traced back from the node I(2) to the root in the index TRIE structure of English, and the node IDs (ID1(2), ID2(2), . . . , and ID4(2)) in the translation dictionary TRIE structure of English are obtained. The English translation is extracted from the translation dictionary TRIE structure of English with the node IDs (ID1(2) ID2(2), . . . , and ID4(2)).

The translation memory is capable of realizing the multilingual machine translation, with which the multiple languages are translated accurately and rapidly, and in addition, the size of the translation dictionary can be reduced to a half to one third that of the conventional TRIE structure, in accordance with the present embodiment of the present invention. In particular, the translation memory of the present invention is suitable for idioms, proverbs, report formats in the technical field, manuals, technical documents, and the like. Further, the translation memory equipped with learning capabilities is made to learn one sentence and the translation thereof, enabling a more accurate translation sentence after learning. The translation memory of the present invention is applicable to the establishment and translation of a multilingual word-by-word dictionary and a multilingual machine translation apparatus on a patterned or example sentence basis.

A description will next be given of a second embodiment of the present invention. The dictionary TRIE structure and the index TRIE structure include multiple languages, preferably, two languages.

Figure 22:
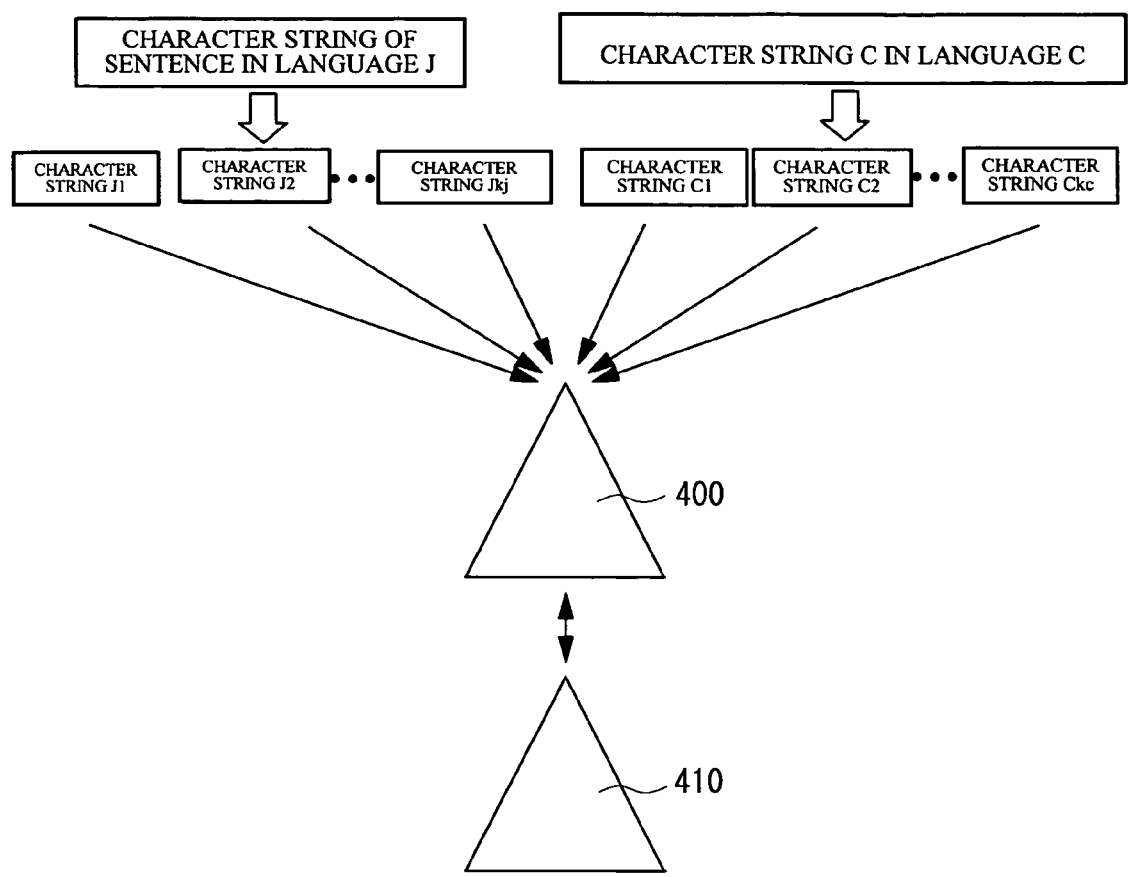
FIG. 22 shows a retrieval dictionary used for the translation memory in accordance with a second embodiment of the present invention.

Referring to FIG. 22, the character string J denoting a sentence in a first language is divided into the sub character strings J1, J2, ..., and Jk1, and the sub character strings J1, J2, ..., and Jk1 are entered into a translation dictionary TRIE structure 400. The character string C denoting a sentence in a second language is divided into the sub character strings C1, C2, ..., and Ck2, and the sub character strings C1, C2, ..., and Ck2 are entered into the translation dictionary TRIE structure 400.

Information of Ji is included as a record on the path from the root to the node of IDi in the translation dictionary TRIE structure 400, and an index TRIE structure 410 is established with ID1, ID2, ..., and IDk1. Information of Cj is included as a record on the path from the root to the node of IDj in the translation dictionary TRIE structure 400, and an index TRIE structure 410 is established with ID1, ID2, ..., and IDk1. Then, the relation between the information on the two languages is added to the index TRIE structure. This makes it possible to correspond the dictionary TRIE structure and the index TRIE structure to the two languages.

Figure 23A:
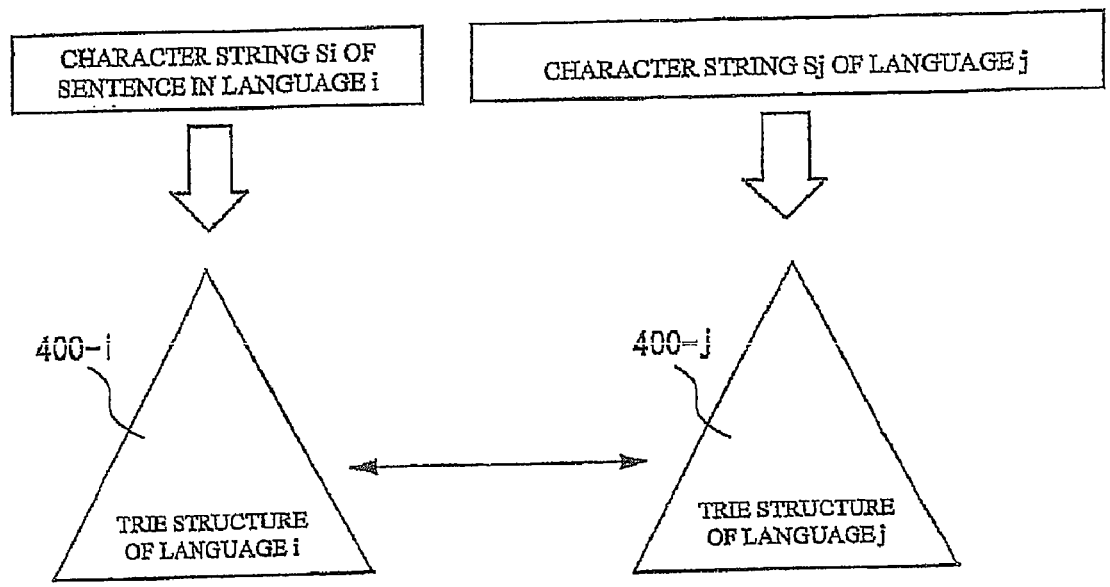
FIG. 23A shows a retrieval dictionary used for the translation memory in accordance with a third embodiment of the present invention.

A description will now be given of a third embodiment of the present invention. The dictionary TRIE structure and the index TRIE structure are included in one structure, in accordance with the third embodiment of the present invention. FIG. 23A shows a retrieval dictionary used for the translation memory in accordance with the third embodiment of the present invention. Here, the retrieval dictionaries of the language i and the language j are shown for simplification.

A character string Si denoting a sentence in the language i is entered into a language TRIE structure 400-i. The information of the character string Si is stored on the path from the root to a terminal node IDi in the language TRIE structure 400-i of the language i. In the same manner, the information of the character string Sj is stored on the path from the root to a terminal node IDj in a language TRIE structure 400-j of the language j.

Figure 23B:
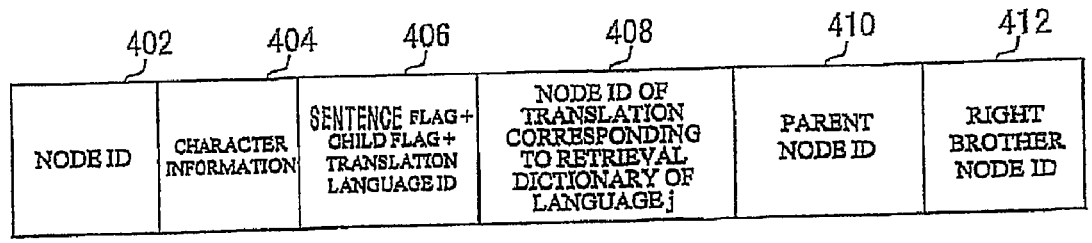
FIG. 23B shows a node structure of the language TRIE structure of the language i in accordance with the third embodiment of the present invention.

FIG. 23B shows a node structure of the language TRIE structure of the language i. The node structure includes a node ID 402, a character information 404, a sentence flag+child flag+translation language ID 406, a node ID 408 of the translation sentence corresponding to the retrieval dictionary of the language j, a parent node 410, and a right brother node 412.

The character string Si is input for translation, the node IDi is searched for from the root in the language TRIE structure 400-i of the language i, the translation information IDj is obtained from the node IDi. The translation sentence Sj is obtainable by scanning back to the root from the node IDj of the language TRIE structure of the language j.

Figures 24A, 24B:
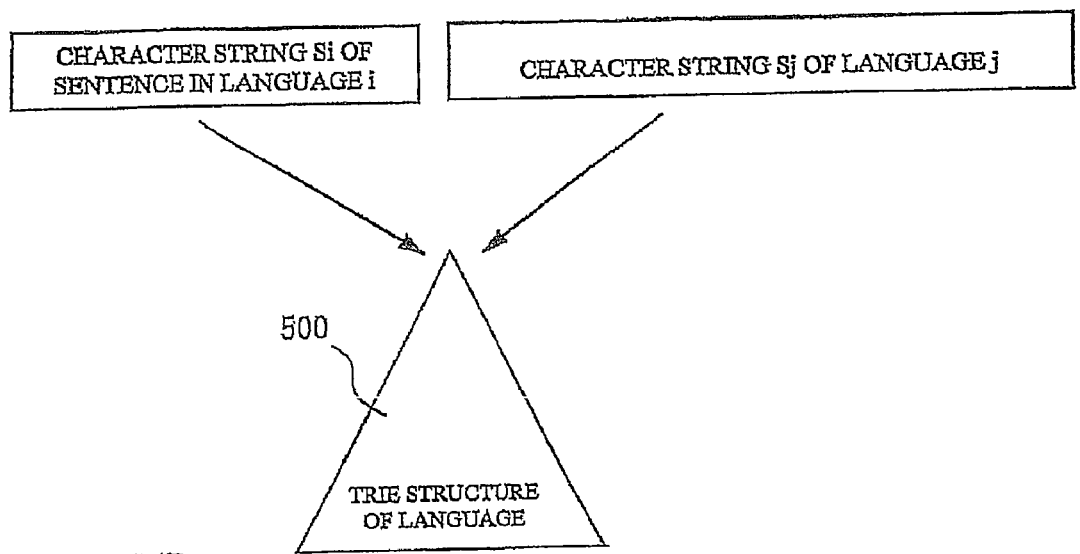
FIGS. 24A and 24B show a variation of the third embodiment of the present invention.

If the retrieval dictionaries are limited to the two languages in accordance with the third embodiment of the present invention, the language TRIE structure may be configured as shown in FIG. 24A. A sentence J in a language 1 and a sentence C in a language 2 are respectively entered in a dictionary TRIE structure 500 for establishing the retrieval dictionary. The path from the root to the node IDj stores the information on the sentence J in the language TRIE structure 500. The path from the root to the node IDc stores the information on the sentence C in the language TRIE structure 500. FIG. 24B shows a node structure. In this case, a node ID 502 of the translation sentence is given to correspond to the language 1 or the language 2.

The sentence J is searched from the root of the language TRIE structure 500 for translation, the node IDj is obtained, and the information IDc of the translation sentence stored I the IDj node. The translation sentence C can be obtained by scanning back to the root from the node IDc of the language TRIE structure 500 of the language j.

With the translation memory of the present embodiment, the following effects are obtainable. The space amount of the translation memory of the first embodiment is almost equal to that of the word index method, yet it has been found that the translation rate with the translation memory of the first embodiment is 24,000 times faster than that of the word index method. Moreover, it has been found that the memory capacity can be reduced significantly as compared to the word index method, and the translation rate is almost 500 times faster than the word index method. Further, it has also found that the translation memory of the first embodiment has the memory capacity smaller than that of the third embodiment by 56 percent. The translation rate of the first embodiment is almost four times faster than that of the third embodiment.

On translation memory in the above-mentioned aspect, the retrieval dictionaries may be built for every language so that the translation of the target language can be selected corresponding to the original language that has been input. In other words, the translation memory of the present invention is a multilingual translation memory.

On translation memory in the above-mentioned aspect, the user inputs a desired sentence and obtains the translation thereof in a corresponding language. The user is capable of selecting the target language.

On translation memory in the above-mentioned aspect, if the dictionary TRIE structure has five characters in each sub character string, the sentence that has been input is divided by five characters and the sub character string having five characters is retrieved in the dictionary TRIE structure.

The translation memory of the present invention is applicable to a multilingual machine translation system, for example, a patterned or example sentence based multilingual machine translation or a chunk example sentence based multilingual machine translation. Also, the translation memory of the present invention is applicable to a scan translation with which a sheet manuscript is translated in real time to get electronic data as in a photocopy, and also to a multilingual translation service with a scan translation apparatus that has a function of judging the credibility automatically and a function of automatic collection. Further, the software to execute the translation memory may be mounted on a computer, or may be used as a mobile or portable electronic dictionary.

Although a few embodiments of the present invention have been shown and described, it would be appreciated by those skilled in the art that changes may be made in these embodiments without departing from the principles and spirit of the invention, the scope of which is defined in the claims and their equivalents.

The entire disclosure of Japanese Patent Application No. 2005-071068 filed on Mar. 14, 2005 including specification, claims, drawings, and abstract is incorporated herein by reference in its entirety.

What is claimed is:

1. A computer-readable translation memory adapted to sentence-based translation comprising:

a first retrieval dictionary of a first language having a first dictionary TRIE structure and a first index TRIE structure; and a second retrieval dictionary of a second language having a second dictionary TRIE structure and a second index TRIE structure, the first and second dictionary TRIE structures respectively storing sub character strings on respective paths from roots to multiple nodes thereof, the first and second index TRIE structures respectively storing index information to specify the sub character strings stored in the first and second dictionary TRIE structures, wherein the index information stored in the first index TRIE structure of the first retrieval dictionary includes identification information that identifies the index information in the second index TRIE structure to specify the sub character strings in the second retrieval dictionary that are translations of sub character strings in the first retrieval dictionary, and wherein the identification information is a pointer to a memory location of index information in the second index TRIE structure that specifies the sub character string in the second retrieval dictionary that is the translation of the sub character string in the first retrieval dictionary.

2. The computer-readable translation memory according to claim 1, wherein the index information specifies the sub character strings with the paths from the roots to the terminal nodes in each of the first and second dictionary TRIE structures.

3. The computer-readable translation memory according to claim 2, wherein the index information includes a piece of node ID information that identifies a corresponding one of the terminal nodes in each of the first and second dictionary TRIE structures.

4. The computer-readable translation memory according to claim 1, wherein the index information in the first retrieval dictionary includes a piece of node ID information that correspond to a node in the index TRIE structure in the second retrieval dictionary.

5. The computer-readable translation memory according to claim 1, wherein the index information specifies a sentence composed of multiple sub character strings with the paths from the root to the terminal nodes in each of the first and second dictionary TRIE structures.

6. The computer-readable translation memory according to claim 1, further comprising a third retrieval dictionary having a third dictionary TRIE structure and a third index TRIE structure, the third dictionary TRIE structure storing the sub character strings on the respective paths from the root to the multiple nodes thereof, the third index TRIE structure storing the index information to specify the sub character strings stored in the third dictionary TRIE structure, wherein the index information stored in the third index TRIE structure of the third retrieval dictionary includes identification information that identifies the index information in the first index TRIE structure to specify the sub character strings in the third retrieval dictionary that are translations of the sub character strings in the first retrieval dictionary, and wherein the identification information is a pointer to a memory location of index information in the first index TRIE structure that specifies the sub character string in the first retrieval dictionary that is the translation of the sub character string in the third retrieval dictionary.

7. A translation memory engine employing the computer-readable translation memory according to claim 1, comprising:

an input portion that receives a sentence in the first language;

a division portion that divides the sentence that has been input into sub character strings;

a retrieval portion that checks the sub character strings with the first dictionary TRIE structure in the first retrieval dictionary and that searches for the index information of the sub character strings checked;

an extraction portion that designates a corresponding index information in the second index TRIE structure in the second retrieval dictionary on the basis of the index information searched, that specifies the sub character strings in the second dictionary TRIE structure on the basis of the index information designated, and that extracts the sentence in the second language; and an output portion that outputs the extracted sentence.

8. The translation memory engine according to claim 7, wherein a number of characters included in each of the sub character strings is equal to the number of characters specified by the path from the root to a terminal node in each of the first through third dictionary TRIE structures.

9. The computer-readable translation memory according to claim 1, further comprising a third through an N-th retrieval dictionaries to correspond to an N number of languages, where N denotes an integer of at least three;

wherein the index information specifies at least one translation relation in each of the first through the N-th retrieval dictionaries.

10. A computer-readable translation memory adapted to sentence-based translation, comprising a retrieval dictionary having a first dictionary TRIE structure of a first language, a second dictionary TRIE structure of a second language, a first index TRIE structure of the first language, and a second index TRIE structure of the second language, the first and second dictionary TRIE structures storing sub character strings on respective paths from a root to multiple nodes thereof, the first and second index TRIE structures storing index information to specify the sub character strings in a respective one of the first and second languages, wherein the index information stored in the first index TRIE structure includes identification information that identifies the index information in the second index TRIE structure to specify the sub character strings in the second dictionary TRIE structure that are translations of sub character strings in the first dictionary TRIE structure, and wherein the identification information is a pointer to a memory location of index information in the second index TRIE structure that specifies the sub character string the second dictionary TRIE structure that is the translation of the sub character string in the first dictionary TRIE structure.

11. A machine translation system comprising:

a translation memory for facilitating sentence-based translation;

a translation engine receiving a sentence that has not been translated using the translation memory, and translating the sentence; and an output portion that separately outputs the sentence translated by the translation memory and a sentence translated with the translation engine, the translation memory including:

a first retrieval dictionary of a first language having a first dictionary TRIE structure and a first index TRIE structure; and a second retrieval dictionary of a second language having a second dictionary TRIE structure and a second index TRIE structure, the first and second dictionary TRIE structures respectively storing sub character strings on respective paths from roots to multiple nodes thereof, the first and second index TRIE structure respectively storing index information to specify the sub character strings stored in the first and second dictionary TRIE structures, wherein the index information stored in the first index TRIE structure of the first retrieval dictionary includes identification information that identifies the index information in the second index TRIE structure to specify the sub character strings in the second retrieval dictionary that are translations of sub character strings in the first retrieval dictionary, and wherein the identification information is a pointer to a memory location of index information in the second index TRIE structure that specifies the sub character string in the second retrieval dictionary that is the translation of the sub character string in the first retrieval dictionary.

12. The machine translation system according to claim 11, wherein the translation engine comprises at least one of a pattern based translation engine, a chunk based translation engine, an analysis based translation engine, and a word-for-word direct translation engine.

13. A method for performing sentence-based translation, the method comprising:

storing sub character strings of first and second languages on respective paths from roots to multiple terminal nodes in first and second dictionary TRIE structures, respectively;

establishing first and second index TRIE structures for the first and second retrieval dictionaries, respectively, to include index information that specifies the sub character strings respectively stored in the first and second dictionary TRIE structures, wherein a first retrieval dictionary includes the first dictionary TRIE structure and the first index TRIE structure, and wherein a second retrieval dictionary includes the second dictionary TRIE structure and the second index TRIE structure, wherein the index information stored in the first index TRIE structure includes identification information that identifies the index information in the second index TRIE structure to specify the sub character strings in the second dictionary TRIE structure that are translations of sub character strings in the first dictionary TRIE structure, and wherein the identification information is a pointer to a memory location of index information in the second index TRIE structure that specifies the sub character string the second dictionary TRIE structure that is the translation of the sub character string in the first dictionary TRIE structure;

receiving a sentence in the first language;

dividing the sentence into the sub character strings;

checking the sub character strings with the first dictionary TRIE structure and searching for the index information of the sub character strings checked;

designating a corresponding index information in the second index TRIE structure on the basis of the index information searched;

specifying the sub character strings in the second dictionary TRIE structure on the basis of the index information designated, extracting the sentence in the second language; and outputting the sentence extracted.

14. A storage medium readable by a computer having stored thereon a translation program code that when executed by the computer performs operations comprising:

storing sub character strings of first and second languages on respective paths from roots to multiple terminal nodes in first and second dictionary TRIE structures, respectively; and establishing first and second index TRIE structures for the first and second dictionary TRIE structures, respectively, to include index information that specifies the sub character strings respectively stored in the first and second dictionary TRIE structures, wherein a first retrieval dictionary includes the first dictionary TRIE structure and the first index TRIE structure, and wherein a second retrieval dictionary includes the second dictionary TRIE structure and the second index TRIE structure, wherein the index information stored in the first index TRIE structure includes identification information that identifies the index information in the second index TRIE structure to specify the sub character strings in the second dictionary TRIE structure that are translations of sub character strings in the First dictionary TRIE structure, and wherein the identification information is a pointer to a memory location of index information in the second index TRIE structure that specifies the sub character string the second dictionary TRIE structure that is the translation of the sub character string in the first dictionary TRIE structure.

15. The storage medium according to claim 14, the operations of the translation program code further comprising:

receiving a sentence in the first language;

dividing the sentence into the sub character strings;

checking the sub character strings with the first dictionary TRIE structure and searching for the index information of the sub character strings checked;

designating a corresponding index information in the second index TRIE structure on the basis of the index information searched for and found;

specifying the sub character strings in the second dictionary TRIE structure on the basis of the index information designated, extracting the sentence in the second language; and outputting the sentence extracted.

16. The storage medium according to claim 14, the operations of the translation program code further comprising:

translating a first character string into a second character string, the first character string including one or more of the sub character strings of the first language and the second character string including one or more of the sub character strings of the second language, the translating comprising matching the first character string to the second character string by linking the first index TRIE structure to the second index TRIE structure.

* * * * *